C. T. BANGS.
TRACTION WHEEL.
APPLICATION FILED DEC. 10, 1906. RENEWED JAN. 9, 1909.
926,313.
Patented June 29, 1909.
2 SHEETS—SHEET 1.
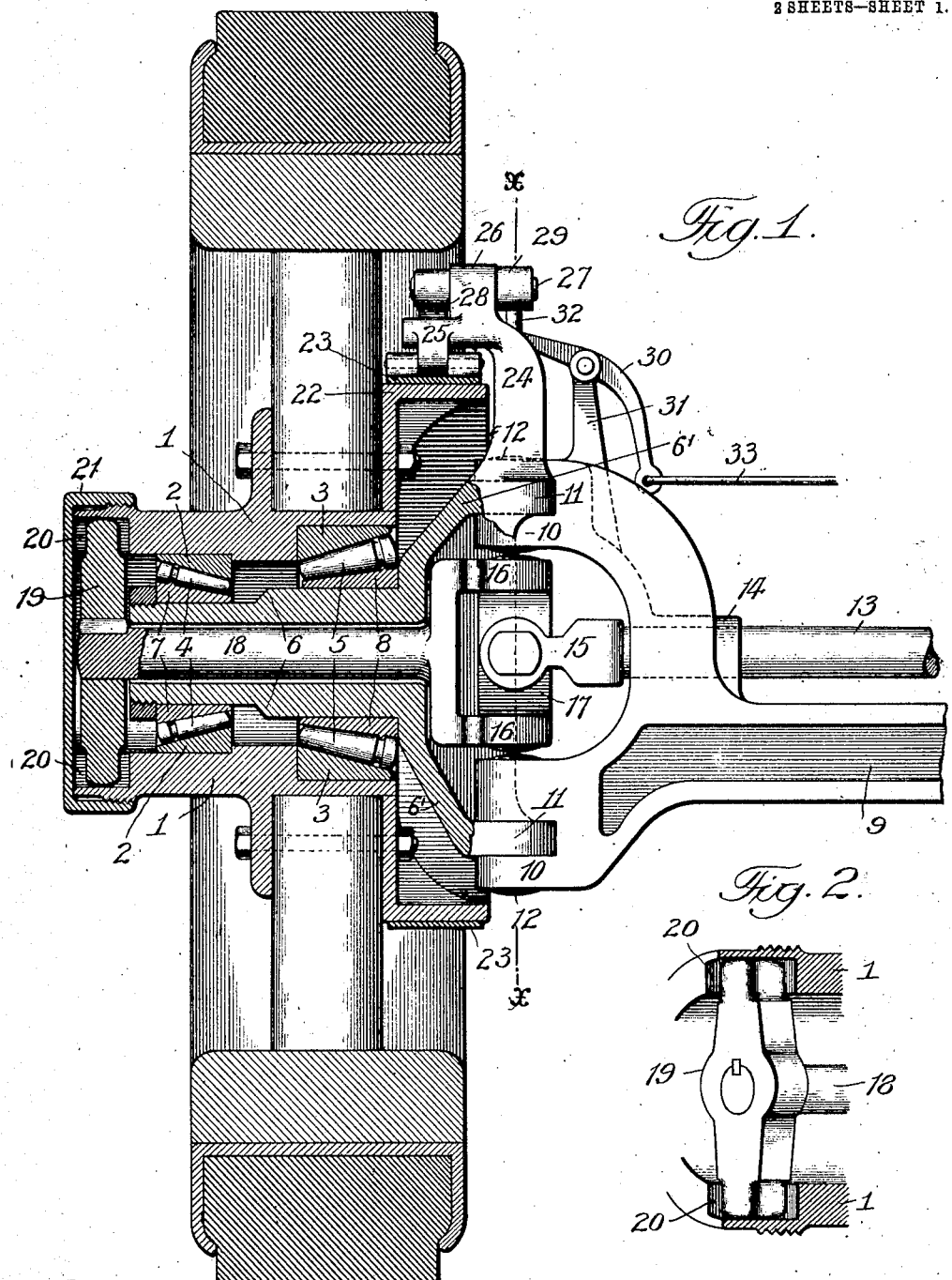
Attest:
John Enders.
Henry Moe.
Inventor:
Chester T. Bangs,
by Robert Burns
Attorney C. T. BANGS.
TRACTION WHEEL.
APPLICATION FILED DEC. 10, 1906. RENEWED JAN. 9, 1909.
926,313.
Patented June 29, 1909.
2 SHEETS—SHEET 2.
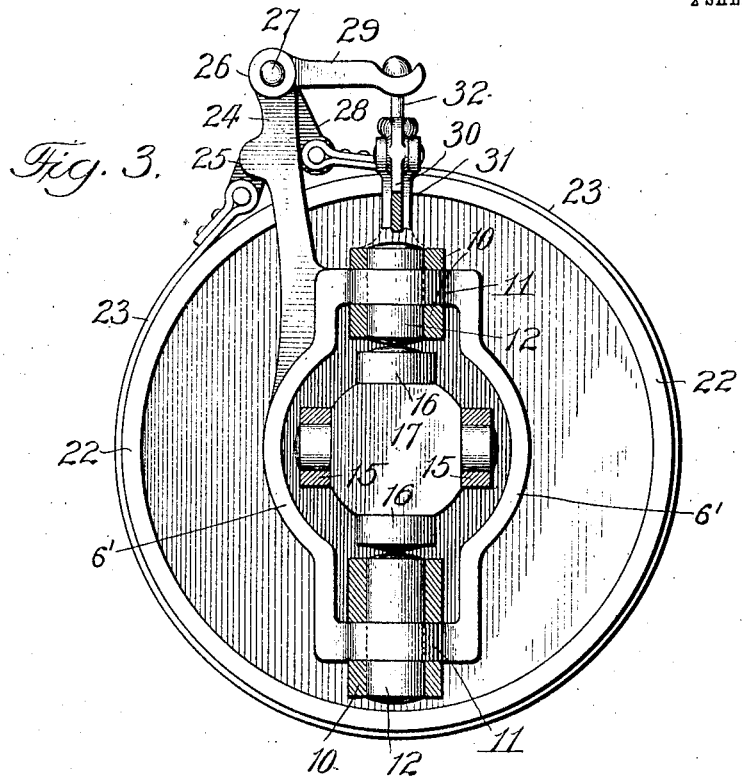
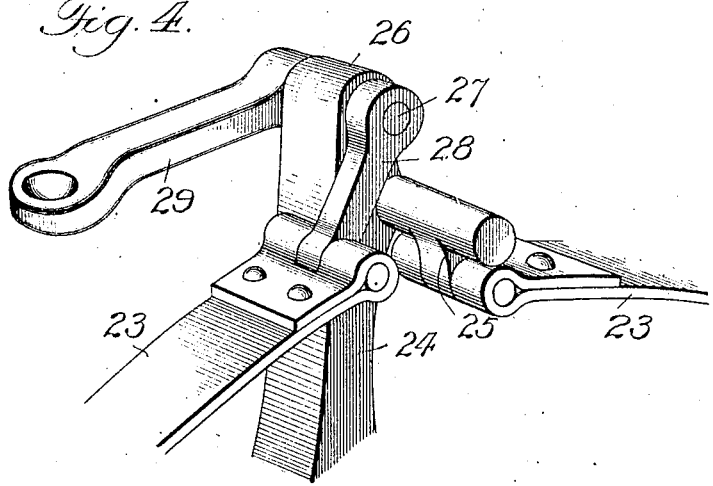
Attest:
John Enders.
Henry Moe.
Inventor:
Chester T. Bangs,
by Robert Burns
Attorney

UNITED STATES PATENT OFFICE.

CHESTER T. BANGS, OF CHICAGO, ILLINOIS.

TRACTION-WHEEL.

No. 926,313.            Specification of Letters Patent.          Patented June 29, 1909.

Application filed December 10, 1906, Serial No. 347,016. Renewed January 9, 1909. Serial No. 471,530.

*To all whom it may concern:*

Be it known that I, CHESTER T. BANGS, a citizen of the United States of America, and a resident of Chicago, in the county of Cook and State of Illinois, have invented certain new and useful Improvements in Traction-Wheels, of which the following is a specification.

This invention relates to that class of traction wheels for automobiles and like uses, in which the wheel is adapted for the dual functions of a driving and steering wheel; and the present improvement has for its object to provide a simple and efficient structural formation and combination of parts adapted to afford a strong and substantial driving connection between the power shaft and the wheel, with an avoidance of excessive friction and wear; and which at the same time affords a durable and effective arrangement of the brake mechanism of a driving and steering wheel of the present type, all as will hereinafter more fully appear.

In the accompanying drawings:—Figure 1, is a vertical axial section of a traction wheel and accessories, to which the present invention is applied. Fig. 2 is a detail perspective view illustrating the hub and cross head connection. Fig. 3, is a vertical section on line x—x Fig. 1, illustrating the arrangement of the brake mechanism of the present invention. Fig. 4, is a detail perspective view of the operative levers &c., of said brake mechanism.

Similar numerals of reference indicate like parts in the different views.

Referring to the drawings, 1 represents the usual wheel hub extending slightly beyond the spokes within the felly at its inner end and having the usual enlarged bore, and which bore is in turn counterbored from each end to form shouldered recesses for the reception of the usual annular and internally coned rings 2 and 3 forming parts of the tracks or races for the usual series of conical rolls 4 and 5, as usual.

6 is the tubular bearing member or thimble arranged axially in the bore of the hub 1. Such thimble is formed with a screw threaded outer end for the reception of the holding and adjusting nut of the coned ring of the roller bearing, hereinafter described; while the inner end of said thimble is formed with a cup shaped enlargement 6′ the upper and lower portions of which constitute the pivot knuckles or jaws of the hereinafter described joint of said thimble with the stationary axle of an automobile.

7 is a coned ring held in a longitudinally adjustable manner upon the outer part of the thimble 6 by a holding nut screwing upon the outer end of the thimble as shown; such coned ring 7 is the companion to the before described coned ring 2 of the hub, and between which coned rings the outer series of bearing rollers 4, are arranged.

8 is a coned ring arranged upon the thimble 6 near its inner end and held against longitudinal movement by abutment against the thimble enlargement 6′ as shown; such coned ring 8 is the companion of the before described coned ring 3 of the hub, and between which rings the inner series of bearing rollers 5 are arranged. It will be observed that the cup shaped enlargement 6′ of the thimble 6 is located adjacent or contiguous to the spokes within the felly so as to provide a compact arrangement of the parts.

9, is an end portion of the stationary axle of an automobile, or like vehicle, formed with end knuckles or jaws 10, in vertically separated relation, and to which corresponding knuckles or jaws 11 on the cup shaped enlargement 6′ of the tubular member or thimble 6, are journaled by pivot pins 12, so that the said thimble is capable of the usual pivoted adjustment on the stationary axle of the vehicle in effecting a steering adjustment of the parts. For attaining such steering adjustment of the thimble and traction wheel carried on the same, the usual lateral arm, not shown, will be provided on said thimble for operative connection with a steering lever convenient to the operator.

13, is the driving or power shaft journaled in a bearing 14 on one of the jaws 10 of the stationary axle, and said shaft carries at its outer end one yoke head 15 of the pair of yoke heads of a universal joint.

16, is the companion yoke head of the universal joint aforesaid; such yoke head is carried by a shaft arranged in the bore of the thimble 6, as hereinafter more fully described. In the present construction the universal joint above described lies almost wholly within the cavity of the cup shaped extension 6′ of the thimble 6, and affords a very compact and strong arrangement of parts whereby the common vertical pivot axis of such universal joint and of the pivot knuckles of the thimble 6 and stationary axle 9 can be arranged desirably close to the driving wheel.

17, is an intermediate block to which the two yoke heads aforesaid are pivotally connected in right angle relation, and with the pivot axis of said yoke heads and of the jaws 10 and 11, on a common vertical plane.

18, is the shaft above referred to, and which is arranged in the central bore of the thimble 6, with its ends projecting at the respective ends of said thimble and carrying at one end the yoke head 16 aforesaid. In the present construction the diameter of said central bore is larger than that of said shaft, in order that said thimble and the wheel carried thereby is capable in actual use of limited independent play in a direction lateral to said shaft, and so that the sudden and violent wrenchings to which the wheel is exposed in actual use will not be imparted to said shaft or the respective end connections thereof.

19, is a cross head keyed or otherwise secured to the other and outer end of the shaft 18, with its ends adapted for driving engagement in diametrically opposed recesses 20, in the wall of the wheel hub 1 as shown. By the described construction and arrangement of the cross-head, a very strong, substantial and durable driving connection is attained, in that it provides a cross head of an extended length, and aids materially in preventing the sudden and violent wrenchings of the wheel from being imparted to the shaft 18 and its connections as above referred to.

21, is a cap piece screwing on the outer end of the hub to inclose and protect the outer ends of the working parts above described.

22, is a brake rim arranged at the inner end of and surrounding the slightly projecting inner end of the hub 1, in concentric relation to the axis of rotation of said hub and against the spokes and also surrounding the cup shaped enlargement 6' of the thimble.

23, is the brake band encircling said brake rim.

24, is a bracket extending radially from the inner end of the thimble 6, and provided with a lateral extension 25 to which one end of the brake band 23, is attached as shown; such bracket is also provided with a journal hub 26, overhanging the brake rim 22, and forming a bearing for a rock shaft 27 carrying the operating arms of the brake band now to be described.

28, is an arm secured to outer end of the rock shaft 27, with its lower end connected to the brake band 23 and adapted in its movements to tighten and loosen the brake band upon the brake rim.

29, is a secondary arm secured to the other end of the rock shaft 27 in a common plane with the pivot axis of the jaws 10 and 11 and yokes 15 and 16 before described.

30, is a bent lever pivoted at its mid-length in a pivot bracket 31 on the stationary axle 9; one end of said lever is connected by an intermediate link 32 with the free end of the arm 29 aforesaid, while its other end is connected by an intermediate rod 33, with a suitable operating lever within convenient reach of the operator. The pivotal connections between the lever 30, intermediate link 32 and arm 29 will preferably be of the ball and socket form shown, to permit of universal movements in the joints, the scope of this part of the present invention embraces however the substitution of any other usual form of universal connection for that shown.

Having thus fully described my said invention what I claim as new and desire to secure by Letters Patent, is:—

1. A traction wheel comprising a stationary axle end having vertically arranged pivot jaws, a tubular thimble formed with a cup shaped enlargement at its inner end, located within the felly and having jaws pivotally connected with the axle jaws, a wheel hub having a pair of opposed recesses at its outer end and journaled on said thimble and extending slightly beyond the spokes, within the felly at its inner end a driving shaft journaled on the axle end; a secondary shaft, a universal coupling connecting the driving shaft to the secondary shaft with the pivot axis of said coupling arranged on a common plane with the axis of the pivot jaws aforesaid, and a cross head at the outer end of the secondary shaft engaging the opposed recesses.

2. In a traction wheel, the combination of a stationary axle end having vertically arranged pivot jaws, a tubular thimble formed with a cup shaped enlargement at its inner end, vertically arranged pivot jaws on said enlargement having pivotal connection with said axle jaws, a wheel hub journaled on said thimble, a driving shaft journaled on the axle end, a secondary shaft arranged axially in said thimble and having driving connection at its outer end with the hub aforesaid, a universal coupling connecting said secondary shaft with the driving shaft, the axis of said coupling being in a common plane with the axis of the pivot jaws aforesaid, a brake rim attached near the inner end of the hub, a brake band encircling said brake rim, a bracket carried by the cup shaped extension of the thimble formed with a bearing hub at its free end, means for attaching one end of the brake band to said bracket, a rock shaft journaled in the hub of said bracket, an arm on said shaft operatively connected to the other end of the brake band, a secondary arm connected to said rock shaft, a bent lever pivoted on a bracket of the stationary axle end, an intermediate link connecting one end of said lever with the secondary arm aforesaid, the pivot axis of said link with the secondary arm and bent lever being in a common plane with the axis of the universal joint and pivot jaws aforesaid, and means for actuating the bent lever, substantially as set forth.

Signed at Chicago, Illinois, this 6th day of December 1906.

CHESTER T. BANGS.

Witnesses:
 ROBERT BURNS,
 HENRY MOE.